(12) United States Patent
Nikitin

(10) Patent No.: US 12,272,100 B1
(45) Date of Patent: Apr. 8, 2025

(54) SENSOR OPTIMIZATION FOR ROBOTIC MANIPULATIONS

(71) Applicant: Amazon Technologies, Inc., Seattle, WA (US)

(72) Inventor: Sergey M. Nikitin, Cambridge, MA (US)

(73) Assignee: Amazon Technologies, Inc., Seattle, WA (US)

( * ) Notice: Subject to any disclaimer, the term of this patent is extended or adjusted under 35 U.S.C. 154(b) by 274 days.

(21) Appl. No.: 17/834,696

(22) Filed: Jun. 7, 2022

(51) Int. Cl.
| | |
|---|---|
| *G06K 9/00* | (2022.01) |
| *B25J 9/16* | (2006.01) |
| *B25J 19/02* | (2006.01) |
| *G06T 7/80* | (2017.01) |
| *G06V 10/12* | (2022.01) |
| *H04N 23/67* | (2023.01) |

(52) U.S. Cl.
CPC ............... *G06T 7/80* (2017.01); *B25J 9/1692* (2013.01); *B25J 9/1697* (2013.01); *B25J 19/023* (2013.01); *G06V 10/12* (2022.01); *H04N 23/675* (2023.01)

(58) Field of Classification Search
CPC ......... G06T 7/80; G06V 10/12; B25J 9/1692; B25J 9/1697; B25J 19/023
See application file for complete search history.

(56) References Cited

U.S. PATENT DOCUMENTS

| | | | |
|---|---|---|---|
| 2007/0186417 A1* | 8/2007 | Smyth ..................... | G06K 7/14 29/894.35 |
| 2014/0081447 A1* | 3/2014 | Young .................... | G06Q 10/08 700/224 |
| 2016/0114488 A1* | 4/2016 | Mascorro Medina ...................... | B25J 9/1697 901/1 |
| 2021/0122053 A1* | 4/2021 | Hallock .................... | G06T 7/70 |

* cited by examiner

*Primary Examiner* — Duy M Dang
(74) *Attorney, Agent, or Firm* — Eversheds Sutherland (US) LLP

(57) ABSTRACT

Systems and techniques for optimizing deployment of a camera scanning system in an environment for item identification are described. An example technique involves obtaining a first set of parameters of the camera scanning system and obtaining a second set of parameters of the environment. A third set of parameters of a predicted scan volume of the camera scanning system are determined based on the first set of parameters and the second set of parameters. At least one of the first or second sets of parameters is modified upon determining that the predicted scan volume satisfies a first predetermined condition. An indication of at least one of the first, second, or third sets of parameters is transmitted upon determining that the predicted scan volume satisfies a second predetermined condition.

20 Claims, 12 Drawing Sheets

US 12,272,100 B1

SENSOR OPTIMIZATION FOR ROBOTIC MANIPULATIONS

BACKGROUND

The present disclosure generally relates to camera-based scanning systems, and more specifically, to systems and techniques for optimizing a camera-based scanning system for reading structured identifiers on items.

Retailers, wholesalers, and other product distributors typically maintain an inventory of various items that may be ordered, leased, borrowed, rented, viewed, and so forth, by clients or customers. For example, an e-commerce website may maintain inventory in a facility, such as a fulfillment center. In this example, when a customer orders an item, the item is picked from inventory, routed to a packing station, packed, and shipped to the customer. Facilities generally use structured identifiers, such as barcodes, to identify and track items through various stages of the facility. A barcode, for example, is typically a set of symbols that stores identifying information about an item associated with the barcode. The barcode on a given item can be read, decoded, and processed to extract the data for a variety of applications (e.g., pricing, order fulfillment, sortation, shipping, etc.).

BRIEF DESCRIPTION OF DRAWINGS

Various embodiments in accordance with the present disclosure will be described with reference to the drawings, where like designations denote like elements. Note that the appended drawings illustrate typical embodiments and are therefore not to be considered limiting; other equally effective embodiments are contemplated.

DETAILED DESCRIPTION

Figure 1:
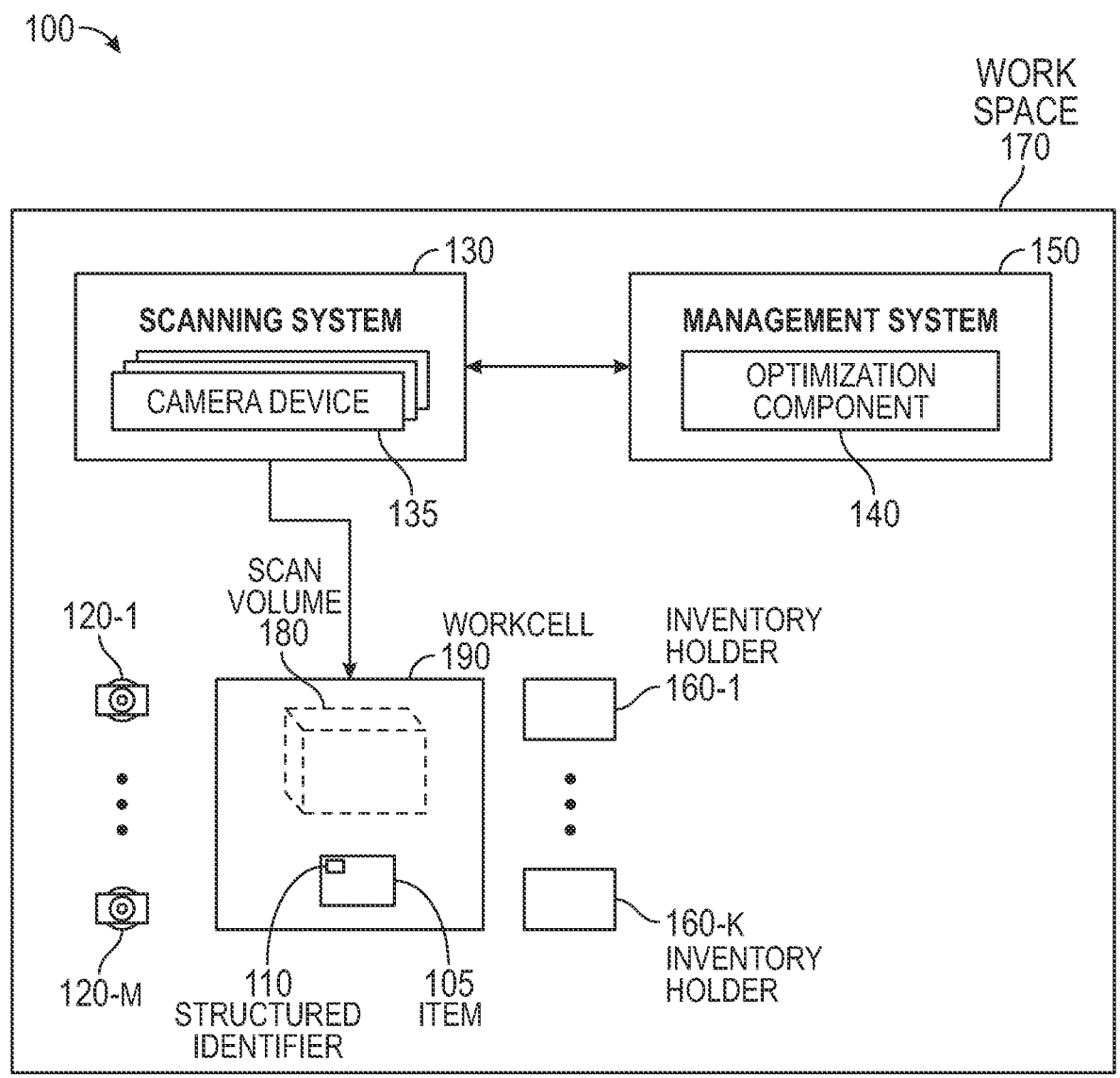
FIG. 1 illustrates an example system for optimizing detection of structured identifiers, according to one embodiment.

A facility (e.g., warehouse, fulfillment center, storehouse, distribution center, etc.) can deploy camera devices in various locations and use the camera devices for item (or package) identification. The camera devices may include camera-based barcode readers that detect and read (or scan) structured identifiers (e.g., linear barcodes or one dimensional (1D) barcodes) on various items in the facility. The structured identifier on an item may include identifying information for the item (e.g., globally unique identifier), target location information for the item, item attributes (e.g., weight, dimensions, item type, etc.), etc. Structured identifiers can be applied to items using different types of labels (also referred to as label stickers, shipping labels, etc.), such as Scan, Label, Manifest, Apply (SLAM) labels, Fulfillment Network Stock Keeping Unit (FNSKU) labels, etc.

For certain facility tasks, such as robotic manipulation tasks, the facility may use a robotic arm (or end-effector) to manipulate various items. In such cases, the facility may have to use a large number of camera devices to successfully identify an item that is manipulated by a robotic arm in an environment (e.g., a workcell within the facility). The number of camera devices may be based on one or more of the following: (i) size of the item, (ii) geometry of the workcell (e.g., size/dimensions of one or more mounting locations for camera devices in the workcell), size of the structured identifier, orientation of the structured identifier, etc. As a facility can process vast quantities of items, in many situations it is critical that any such facility that uses camera devices to identify items be capable of operating at a very high rate of success. For example, if a facility has a high rate of mis-identifying items, such failures could significantly delay the workflow of the facility.

However, conventional approaches for deploying camera devices for item identification can be significantly complex and time consuming, causing the facility to incur significant costs and waste resources. For example, conventional approaches typically rely on manual brute force techniques to determine the optimum placement, orientation, and configuration of camera devices in a given facility.

As such, embodiments described herein provide systems and techniques for optimizing a camera-based scanning system for reading (or scanning) structured identifiers on items. As described below, embodiments provide an optimization component that evaluates one or more parameters of a camera-based scanning system to optimize deployment and configuration of the camera-based scanning system. The parameters (or properties), for example, can include, but are not limited to, parameters of an image sensor of the camera device, parameters of imaging optics (e.g., lens) of the camera device, item attributes, parameters of the workcell (e.g., dimensions of the workcell, including dimensions of frames and/or mounting locations for deploying camera devices), parameters of one or more illumination devices within the workcell, parameters of structured identifiers, and so on.

In one embodiment described herein, the optimization component can determine location and size of a scan (or scanning) volume within a workcell for performing item identification, based on the parameters of the image sensor(s), lens(es), placement location(s) for the image sensor(s), placement orientations for the image sensor(s), etc. Additionally, in another embodiment described herein, the optimization component can determine, based on one or more target parameters (e.g., size and/or location) of a target (or desired) scan volume within a workcell, deployment information for one or more camera devices of a camera-based scanning system that will achieve the desired scanning volume. The deployment information can include a number of image sensors, a location for each of the number of image sensors, an orientation for each of the number of image sensors, etc. In some embodiments, the number of image sensors may be a minimum number of image sensors that associated with a given structured identifier scanning performance (e.g., a predefined (or target) read rate). Embodiments described herein can also take into account the perspective of structured identifiers across different locations inside a field-of-view (FoV) of a given camera device.

In this manner, embodiments can provide an optimized camera-based scanning system that uses a minimum number of camera devices to achieve a target scan zone within a workcell associated with a target level of structured identifier scanning performance (e.g., a predefined (or target) read rate). Note that while embodiments herein primarily discuss "camera-based scanning systems" within a facility, such as a fulfillment center, this disclosure is not limited to such environments and can be used for other applications. For example, the techniques described herein could be used in retail stores (e.g., to identify and track items for sale), in postal service locations (e.g., to identify and track mail), or in any environment (including indoor and outdoor environments) in which item identification is involved. Additionally, while embodiments herein primarily use "barcodes" as a reference example of structured identifiers, the structured identifiers can include any type of globally unique identifier used to identify an item. Such structured identifiers can include, for example, visual and/or geometric features of a label (e.g., ridges, edges, pixel value intensity changes), text, 1D barcodes, two-dimensional (2D) barcodes, etc.

FIG. 1 illustrates an example system 100 with an optimization component 140, according to one embodiment. The system 100 may be located in an environment, such as a facility (e.g., warehouse, factory, fulfillment center, distribution center, etc.). In one particular embodiment, the system 100 is at least a partially robotic system (e.g., the system 100 may deploy one or more robotic equipment to aid in various tasks). For example, the system 100 can be located in a fulfillment center that performs various operations in order to ship items to customers.

Here, the system 100 includes a workspace 170, which may represent all or part of the floor of facility in which the system 100 operates. Although FIG. 1 shows, for the purposes of illustration, an embodiment of the system 100 in which the workspace 170 includes a fixed, predetermined, and finite physical space, particular embodiments of the system 100 may include a workspace 170 that is of variable dimensions and/or of an arbitrary geometry.

In this embodiment, the workspace 170 includes a scanning system 130 (also referred to as a scan system), a management system 150, one or more drive units 120 1-M, a workcell 190, and one or more inventory holders 160 1-K. The workcell 190 is representative of a designated area (or location) within the workspace 170 where a facility task(s) is performed. Examples of such facility tasks may include, but are not limited to, sorting operations, picking operations, packing operations, staging operations, stowing operations, etc. One or more items 105 may be transitioned into the workcell 190 from other locations within the workspace 170. In the embodiment depicted in FIG. 1, for example, a drive unit 120 may retrieve an inventory holder 160 and transition the inventory holder 160 into the workcell 190 for a stowing or picking operation.

The scanning system 130 includes one or more camera devices 135 that are configured to perform item (or package) identification by detecting and decoding structured identifiers on the detected items. Each camera device 135 may include an imaging sensor, imaging optics (e.g., a lens), projector(s) (e.g., infrared (IR) projector(s)), processor(s), memory, etc. The imaging sensor may be representative of a variety of types of electronic image sensors, including, for example, complementary-metal-oxide-semiconductor (CMOS) image sensors. Additionally, the imaging sensor can include an RGB camera sensor or a grayscale camera sensor. The imaging sensor may use a rolling shutter or a global shutter. The imaging optics may include various optics, such as one or more lens with a particular focal length.

As described below, each camera device 135 may be deployed within the workcell 190 (or within other areas of the workspace 170) in a particular location and/or in a particular orientation. In one embodiment described herein, the scanning system 130 may have a corresponding scan volume 180 that is created by the camera devices 135. For example, the scan volume 180 may be a 3D region of space within a FOV(s) of the camera device(s) 135 in which the scanning accuracy (e.g., read rate) of structured identifiers 110 on various items satisfies a predetermined threshold. Although shown as within a workcell 190, the scan volume 180 may be deployed elsewhere within the system 100 (e.g., the area in front of (or adjacent) to a drive unit 120).

As noted, conventional systems typically deploy camera devices 135 without accounting for various parameters, including, for example, image sensor parameters, lens parameters, illumination parameters, workcell parameters, etc. Consequently, a given workcell 190 may have an unnecessary number of camera devices 135 deployed within the workcell 190 for item identification. Additionally or alternatively, in some conventional deployments, the resulting scan volume 180 may be substantially limited (or smaller) compared to the FOV of the camera device(s) 135.

To address this, the system 100 includes an optimization component 140, which may include hardware components, software components, or combinations thereof. Although FIG. 1 depicts the optimization component 140 being located within the management system 150, the optimization component 140 may be located elsewhere. For example, in some embodiments, the optimization component 140 may be located within another computing system, such as the scanning system 130. In some embodiments, the optimization component 140 may be located within one or more computing systems distributed across a cloud computing environment.

In one embodiment, the optimization component 140 can determine parameters (e.g., a location and/or size) of an optimal scan volume given parameters of the camera device 135 (e.g., parameters of the imaging sensor, parameters of the lens, etc.), parameters of a computer vision (CV) algorithm (e.g., contrast, pixels per module (PPM) value, etc.), illumination parameters (e.g., red light, green light, etc.), parameters of the workcell, etc. In one embodiment, the optimal scan volume may be a scan volume in which the read rate for decoding structured identifies is greater than a predetermined threshold.

In another embodiment, the optimization component 140 can determine deployment information for deploying camera device(s) in an environment (e.g., workcell 190) to achieve a target (or desired) scanning volume. The deployment information may include a number of camera devices, a placement location for each of the number of camera devices, an orientation for each of the number of camera devices, illumination parameter(s) for illumination device(s) within the environment, etc., that will achieve a target (or desired) scanning volume. In some cases, the number of camera devices may be a minimum number of camera devices that will achieve the target (or desired) scanning volume. The optimization component 140 may transmit the deployment information to another computing system to be used for deploying camera devices in the facility. Note the optimization component 140 is described in greater detail below.

Figure 2B:
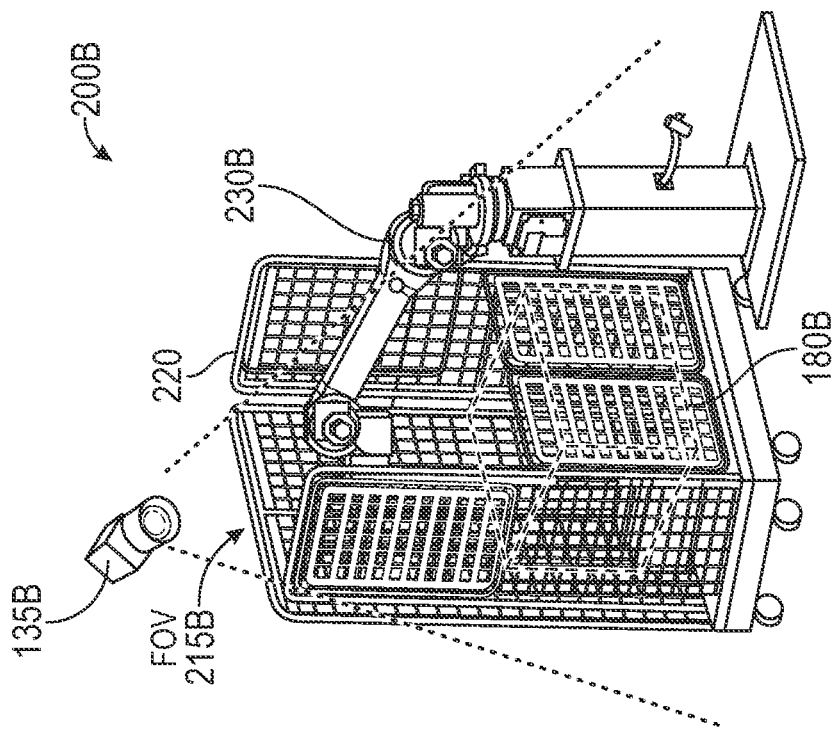
FIGS. 2A-2D illustrate different examples of workcells in a facility, according to various embodiments.
Figure 2A:
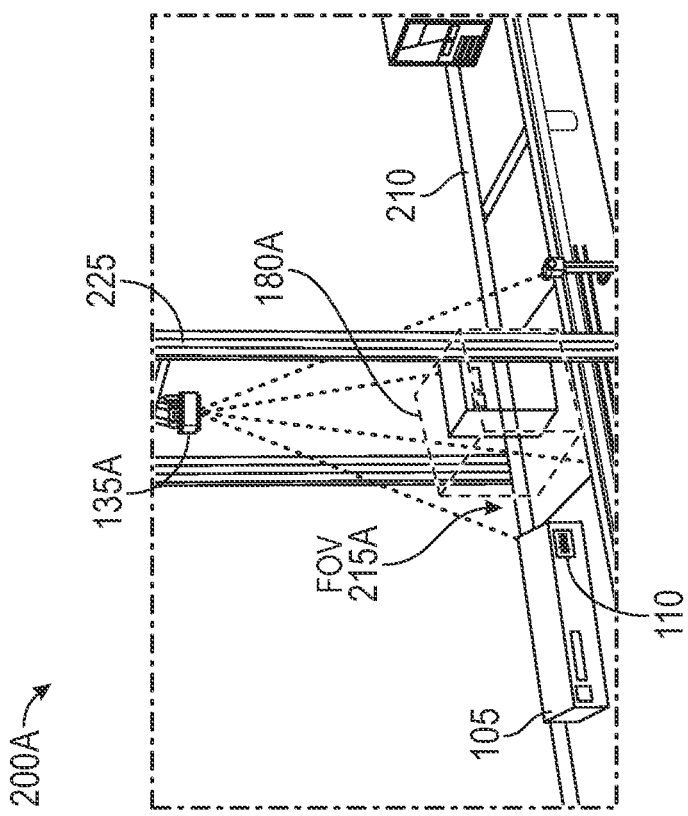
Figure 2C:
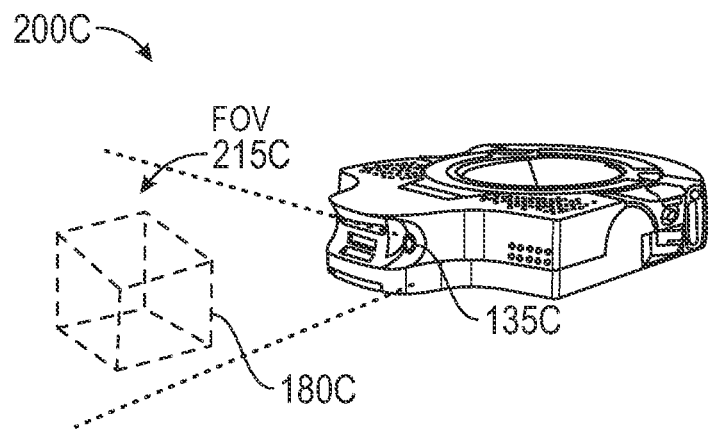
Figure 2D:
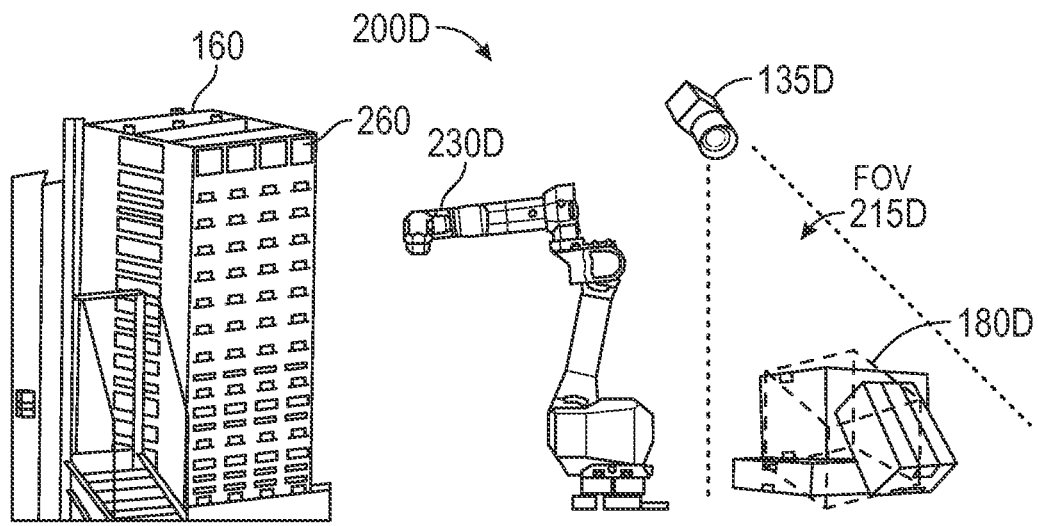

FIGS. 2A-2D illustrate different examples of workcells 200 A-D, respectively, which may be deployed within a facility. Each of the workcells 200 A-D may be representative of a workcell 190, described above relative to FIG. 1. In FIG. 2A, the workcell 200A includes a conveyor 210 which transitions items 105 under a camera device 135A for item identification. The camera device 135A may be supported by a frame 225 (e.g., the frame 225 may have one or more mounting locations for deploying the camera device 135A). As shown, although the camera device 135A has a FOV 215A, the effective scanning region is limited to the scan volume 180A, which represents the 3D region in which the structured identifier on the item can be accurately detected and decoded.

In FIG. 2B, the workcell 200B includes a robotic arm 230B that packs items 105 into a transport device 220. Here, although the camera device 135B has a FOV 215B, which encompasses a substantial portion of the transport device 220, the effective scanning region is limited to the scan volume 180B. Similarly, in FIG. 2C, the workcell 200C includes a drive unit 120, which includes a camera device 135C. The camera device 135C may be used to navigate within the environment, perform obstacle detection (e.g., detecting items within a FOV of the camera device 135C), perform obstacle avoidance (e.g., avoiding items in a path of the drive unit 120), etc. While the camera device 135C has a FOV 215C, the effective scanning region is limited to the scan volume 180C. Similarly, in FIG. 2D, the workcell 200D includes a robotic arm 230D that retrieves items 105 from a holding area and stows the items into a container 260 within an inventory holder 160. Here, while the camera device 135D has a FOV 215D, the effective scanning region is limited to the scan volume 180D.

Figure 3:
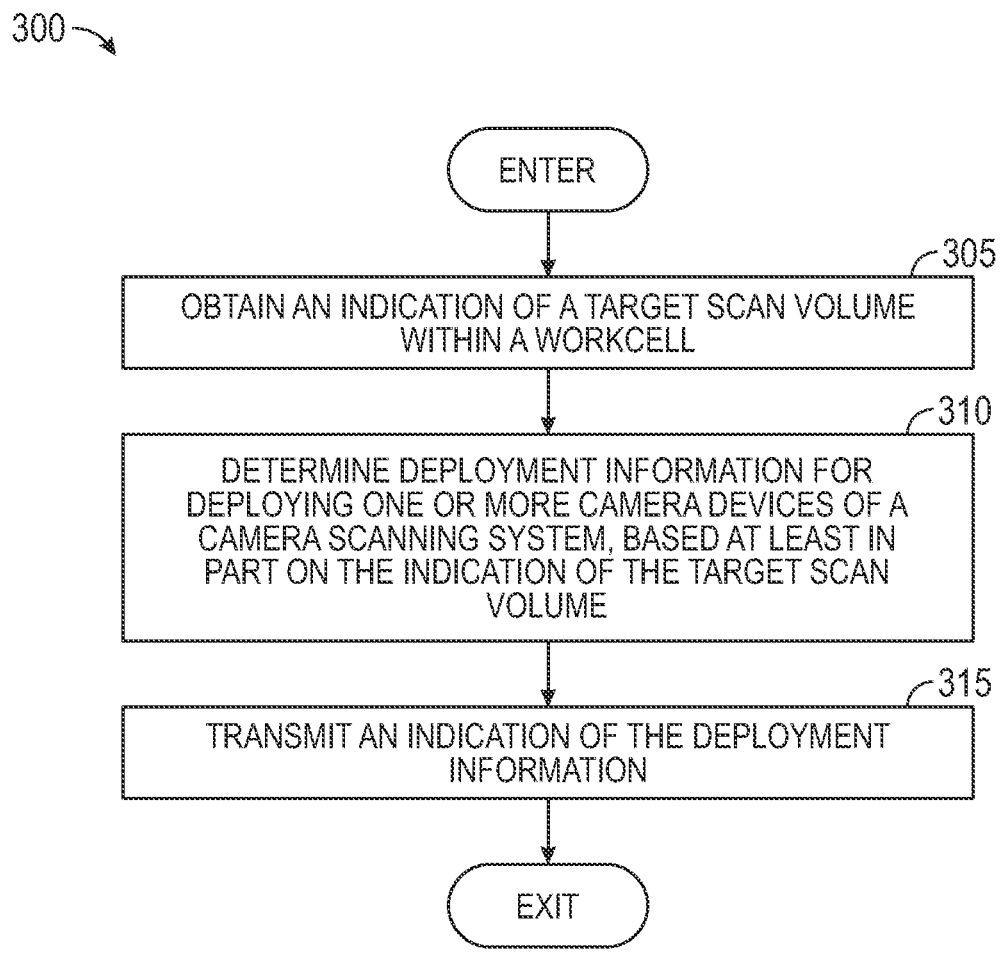
FIG. 3 is a flowchart of an example method for optimizing a camera-based scanning system, according to one embodiment.

FIG. 3 is a flowchart of a method 300 for optimizing a camera-based scanning system (e.g., scanning system 130), according to one embodiment. The method 300 may be performed by an optimization component (e.g., optimization component 140).

Method 300 may enter at block 305, where the optimization component obtains an indication of a target (or desired) scan volume within a workcell (e.g., workcell 190). In one embodiment, the indication may include one or more parameters of the target (or desired) scan volume. For example, the parameters may include at least one of a location of the scan volume within the workcell or a size of the scan volume within the workcell.

At block 310, the optimization component determines deployment information for deploying one or more camera devices of the camera-based scanning system, based at least in part on the indication of the target scan volume. In one embodiment, the optimization component may evaluate the parameter(s) of the target scan value using one or more machine learning (ML) and/or computer vision (CV) algorithms to determine the deployment information. The ML and/or CV algorithms may include, but are not limited to, modulation transfer function (MTF)-contrast algorithms, angular prediction algorithms, etc. The ML and/or CV algorithms may reason over various parameters of the camera-based scanning system, including parameters of the camera devices (including lens, imaging sensors, pixel size, etc.), parameters of the workcell (e.g., geometrical location of sensors, illumination devices, etc., within the workcell), etc.

The optimization component at block 310 can take into account one or more of the following: (i) physical parameters of the image sensor (within a camera device), including, for example, noise, aberration, MTF, pixel size, etc., (ii) parameters of the imaging optics (e.g., lens) of the camera device, (iii) orientation of the target image, (iv) light settings (e.g., level of illumination) within the workcell, (v) target settings of one or more ML and/or CV algorithms (e.g., contrast, PPM value, etc.), (vi) parameters of the structured identifier (e.g., barcode resolution), etc.

At block 315, the optimization component transmits an indication of the deployment information (e.g., to another computing system, operator, etc.). The deployment information may include at least one of a number of camera devices to deploy within the workcell, deployment location(s) for the camera device(s), deployment orientation(s) for the camera device(s), lens/focus parameters for the camera device(s), illumination parameters for the workcell (e.g., wavelength, intensity, polarization, time of flashing, light pulse duration, angular distribution of light, coherence length, etc.), etc. The method 300 may then exit.

Figure 4:
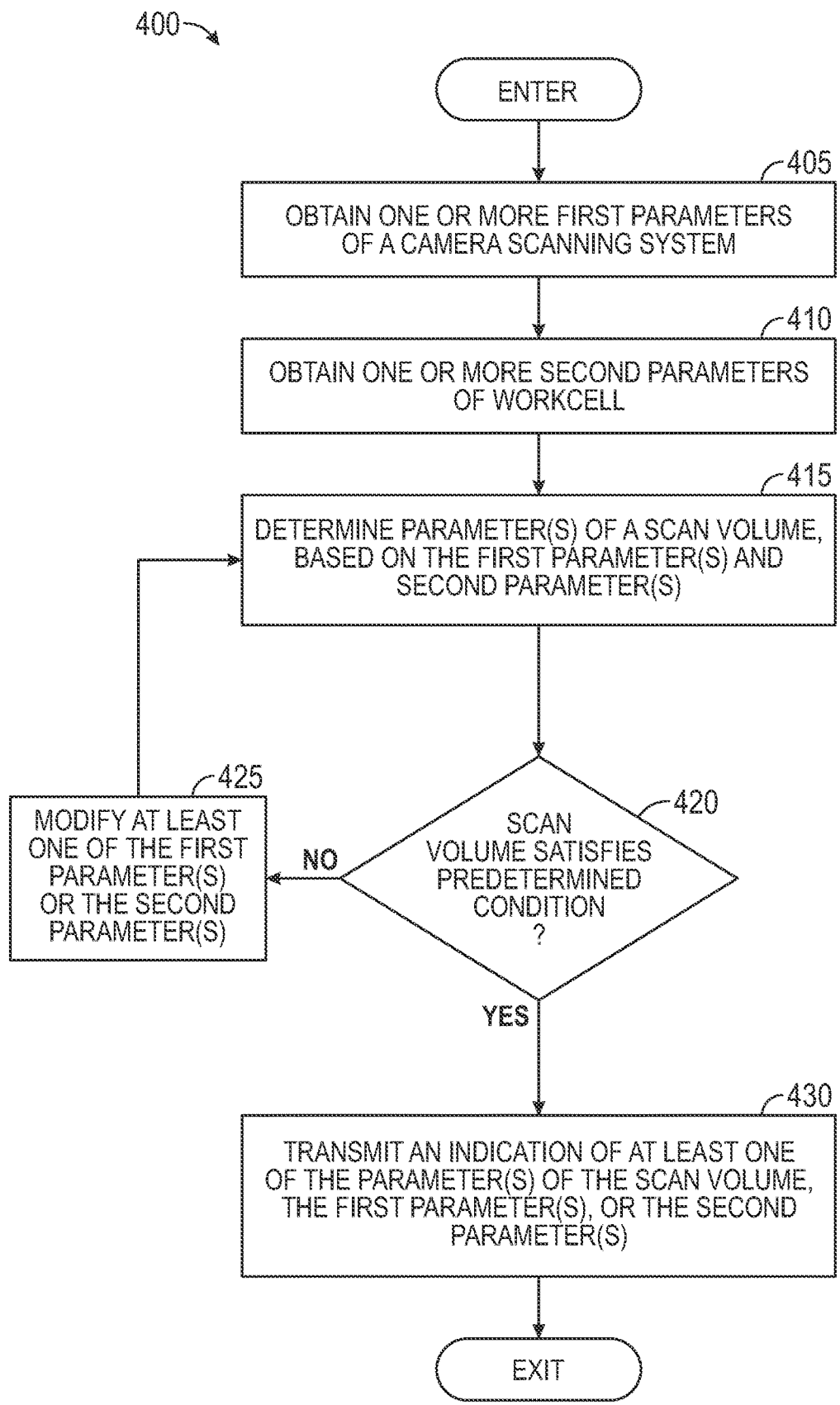
FIG. 4 is a flowchart of another example method for optimizing a camera-based scanning system, according to one embodiment.

FIG. 4 is a flowchart of another method 400 for optimizing a camera-based scanning system (e.g., scanning system 130), according to one embodiment. The method 400 may be performed by an optimization component (e.g., optimization component 140).

Method 400 may enter at block 405, where the optimization component obtains one or more first parameters of a camera-based scanning system. The first parameters may include parameters of an imaging sensor of a camera device (e.g., focus distance, pixel size, number of horizontal pixels, number of vertical pixels), parameters of an optical lens of the camera device (e.g., f-number of lens, lens focal length, etc.), parameters of a CV algorithm used for decoding structured identifiers (e.g., minimum contrast for decoding, minimum PPM value for decoding).

At block 410, the optimization component obtains one or more second parameters of a workcell (e.g., workcell 190). The second parameters may include illumination parameters for the workcell (e.g., wavelength, intensity, polarization, time of flashing, etc.), parameters of the structured identifiers used within the workcell (e.g., minimum barcode resolution, angle between structured identifier and imaging sensor, etc.), physical specifications of the workcell, etc.

At block 415, the optimization component determines one or more parameters of a scan volume, based on the first parameter(s) and second parameter(s). In one embodiment, the optimization component may determine the parameter(s) of the scan volume, based on evaluating the first and second parameter(s) with a CV algorithm. As described in more detail below with respect to FIG. 6, in one embodiment, the optimization component may use a MTF model to determine the (i) depth-of-field (DoF) of the camera-based scanning system and (ii) contrast versus distance results of the camera-based scanning system.

At block 420, the optimization component determines whether the scan volume satisfies one or more predetermined conditions. For example, the optimization component may determine whether a read rate associated with the scan volume is above a threshold. If so, then the optimization component transmits an indication of at least one of the parameter(s) of the scan volume, the first parameter(s), or the second parameter(s) (block 430) (e.g., to another computing system).

On the other hand, if the optimization component determines (at block 420) that the scan volume does not satisfy the one or more predetermined conditions (e.g., the read rate associated with the scan volume is less than (or equal) to the threshold), then the optimization component modifies at least one of the first parameter(s) or the second parameter(s) (block 425). The method 400 then proceeds to block 415. In this manner, the optimization component can continually modify values of the first parameter(s) and/or second parameter(s) to determine the set of parameter(s) that will achieve an optimal scan volume (e.g., a scan volume that satisfies predetermined condition).

Figure 5:
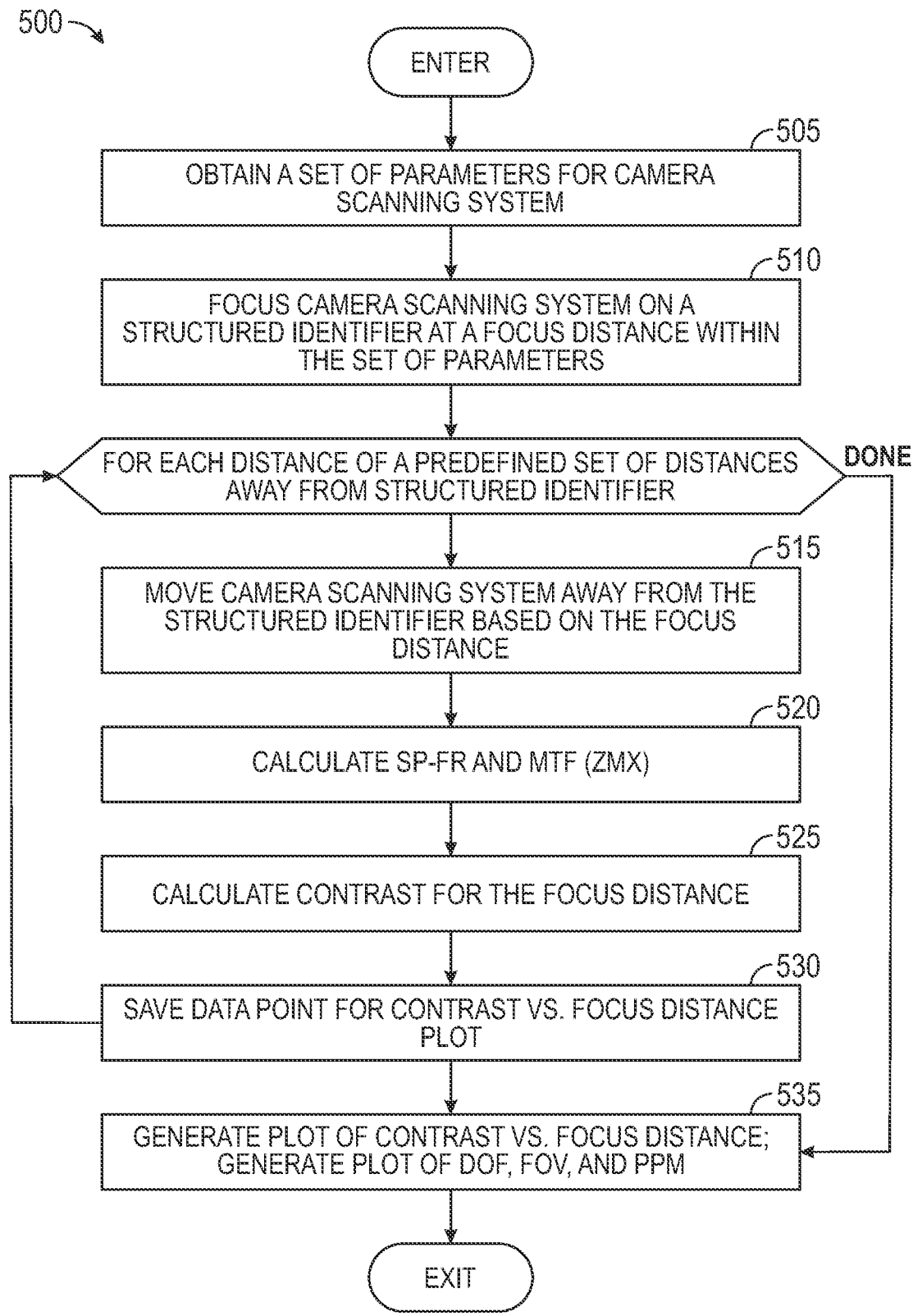
FIG. 5 is a flowchart of a method for generating a depth-of-field of a camera-based scanning system, according to one embodiment.

FIG. 5 is a flowchart of a method 500 for generating a depth-of-field (DoF) of a camera-based scanning system (e.g., scanning system 130), according to one embodiment. The method 500 may be performed by an optimization component (e.g., optimization component 140).

Method 500 may enter at block 505, where the optimization component obtains a set of parameters for the camera-based scanning system. The set of parameters may include parameters associated with camera devices (including lens and imaging sensors), parameters associated with the environment (e.g., workcell), etc. For example, the set of parameters may include a focus distance, a pixel size, a minimum contrast for decoding a structured identifier, a minimum PPM value for decoding a structured identifier, a target barcode resolution, a lens focal length, an f-number of the lens, angle between the structured identifier and imaging sensor, light wavelength, number of pixels in horizontal direction, number of pixels in vertical direction, etc.

At block 510, the optimization component focuses the camera scanning system on a structured identifier at a focus distance within the set of parameters. The optimization component may then perform the operations in blocks 515-520, for each focus distance of a predefined set of focus distances away from the structured identifier. At block 515, the optimization component moves the camera scanning system away from the structured identifier based on the respective focus distance. For example, the camera scanning system may adjust the imaging sensor, lens, etc. to the respective focus distance away from the structured identifier.

At block 520, the optimization component calculates a spatial frequency (SP-Fr) and a MTF of the camera scanning system for the focus distance. The spatial frequency may be expressed in terms of cycles (or line-pairs) per millimeter and may be determined using the following Equation (1):

$$\text{Spatial Frequency} \cong \left(\frac{\text{focal length} * \text{resolution} * 2}{\text{work distance} * 39.37}\right)^{-1} \quad (1)$$

where the work distance is approximately equal to the distance between the camera device and the object plane of the optical lens of the camera device. The MTF (for an aberration-free image with a circular pupil (when system is in focus)) may be determined using the following Equations (2)-(4):

$$MTF(\xi) = \frac{2}{\pi}(\varphi - \cos\varphi \cdot \sin\varphi) \quad (2)$$

$$\varphi = \cos^{-1}\left(\frac{\xi}{\xi_c}\right) \quad (3)$$

$$\xi_c = \frac{1}{\lambda \cdot \left(\frac{f}{\text{stop}}\right)} \quad (4)$$

where ξ is the spatial resolution of the camera scanning system (e.g., the smallest line-pair the system can resolve).

Figure 6A:
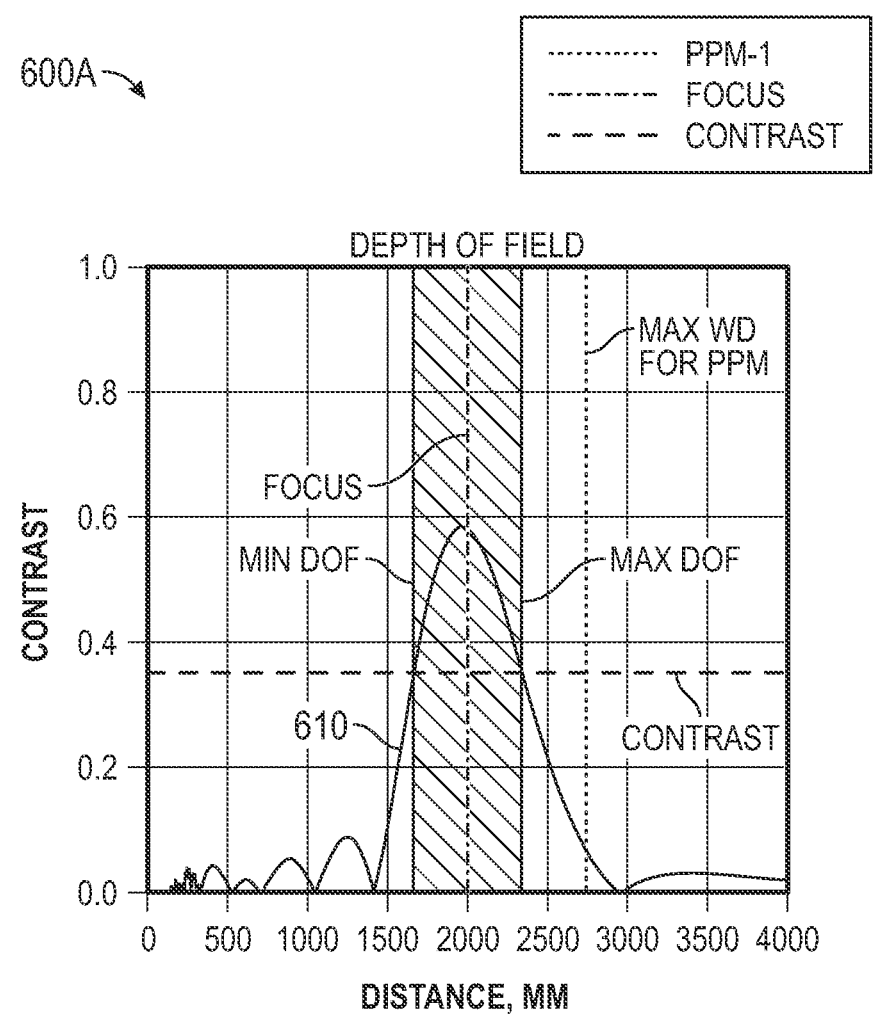
FIG. 6A is a graph of contrast vs. distance, according to one embodiment.
Figure 6B:
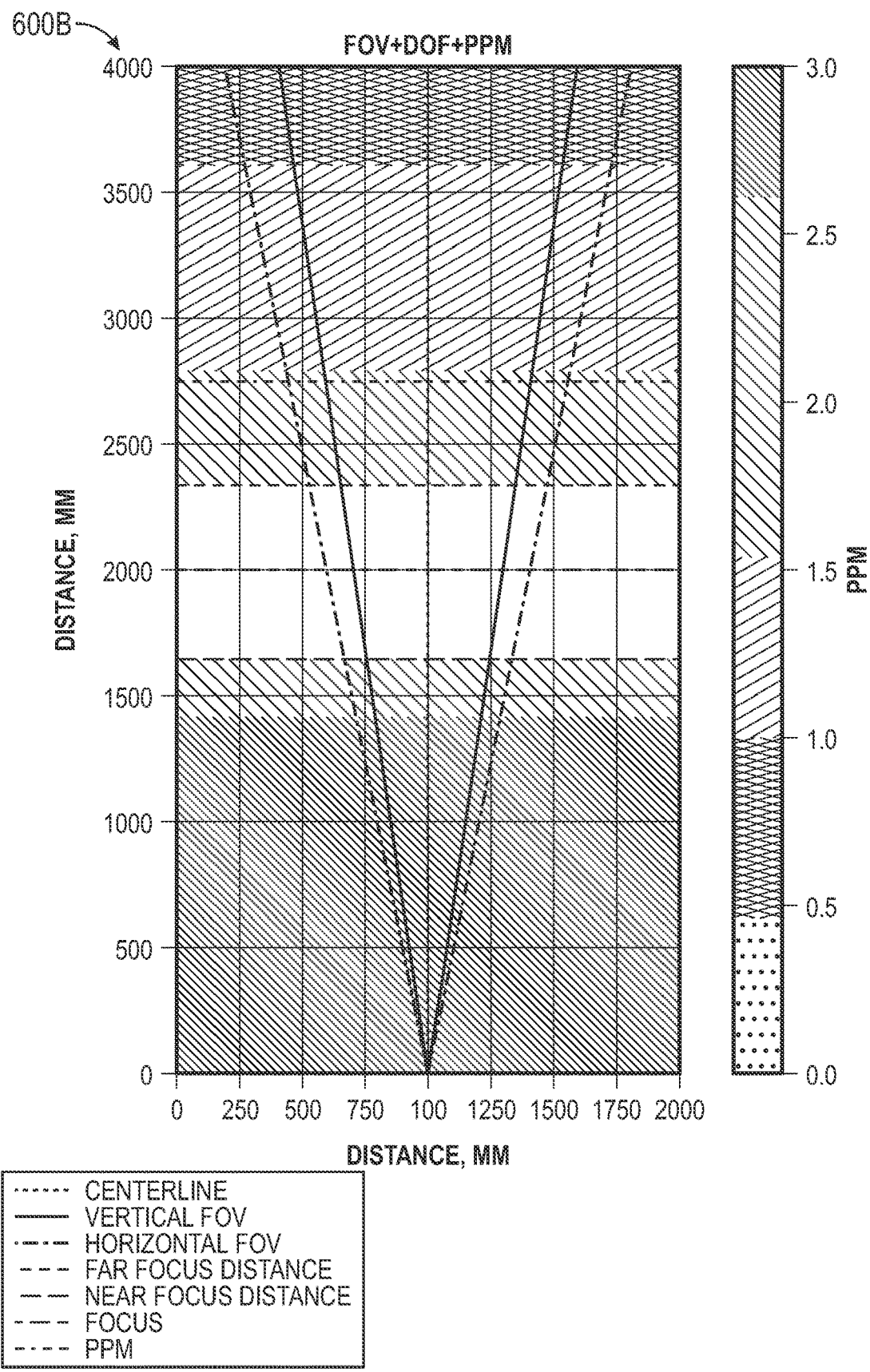
FIG. 6B is a graph of depth-of-field, field-of-view, and pixels per module, according to one embodiment.

At block 525, the optimization component calculates the contrast for the focus distance. At block 530, the optimization component saves data point for a contrast vs. (focus) distance plot. At block 535, the optimization component generates a plot of the contrast vs. (focus) distance and/or a plot of DoF, FOV, and PPM. An example of a DoF plot 600A is illustrated in FIG. 6A, according to one embodiment. In the DoF plot 600, the curve 610 represents contrast as a function of focus distance and indicates how contrast may degrade as the focus distance increases. FIG. 6B illustrates an example plot 600B of the DoF, FOV, and PPM that may be output from the method 500 (e.g., from the operations in block 535 of the method 500).

Figure 7:
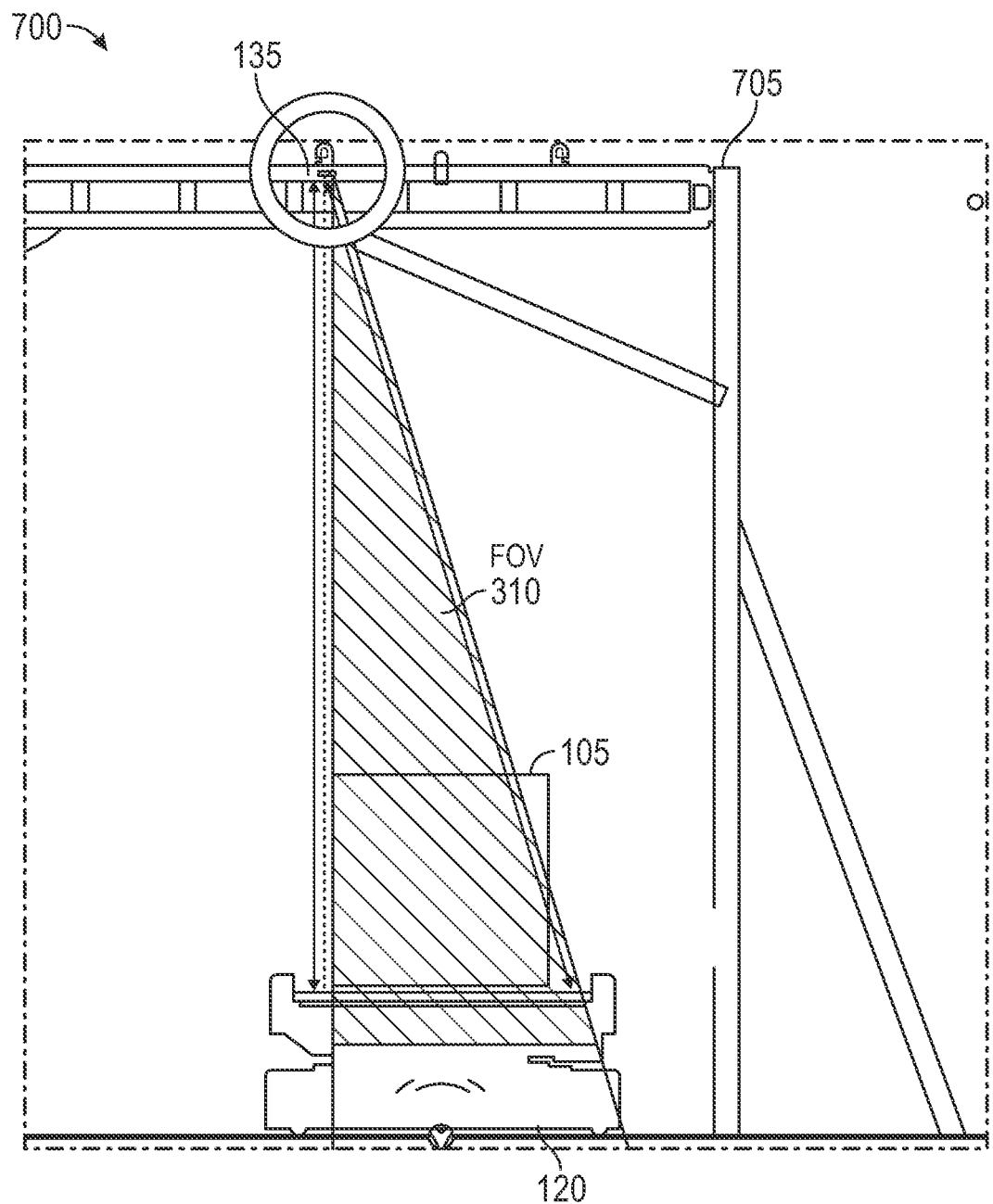
FIG. 7 illustrates an example workcell scenario, according to one embodiment.

FIG. 7 illustrates an example workcell 700, according to one embodiment. The workcell 700 may be representative of a workcell 190, described relative to FIG. 1, in one embodiment. As shown, the workcell 700 includes a support frame 705 that provides support for deploying one or more camera devices. For example, the support frame 705 may provide one or more mounting locations for mounting a camera device. The workcell 700 also includes a drive unit 120 that provides support for an item 105. As noted above, it may be time consuming and significantly complex to determine an optimal scanning volume for the workcell 700 using conventional techniques. For example, it may be unclear as to which camera device and/or lens to use, where to focus the camera device, where to set f/stop, whether a single camera device (as opposed to multiple camera devices) can cover the target scan volume, etc.

In one embodiment, the optimization component 140 described herein can optimize a camera-based scanning system for the workcell 700 depicted in FIG. 7. The optimization component 140, for example, can determine the location and size of an optimal scanning volume given parameters of the camera-based scanning system. In another embodiment, the optimization component 140 can determine optimal parameters for deploying the camera-based scanning system given a target location and/or size of the scan volume within the workcell 700.

Figure 8B:
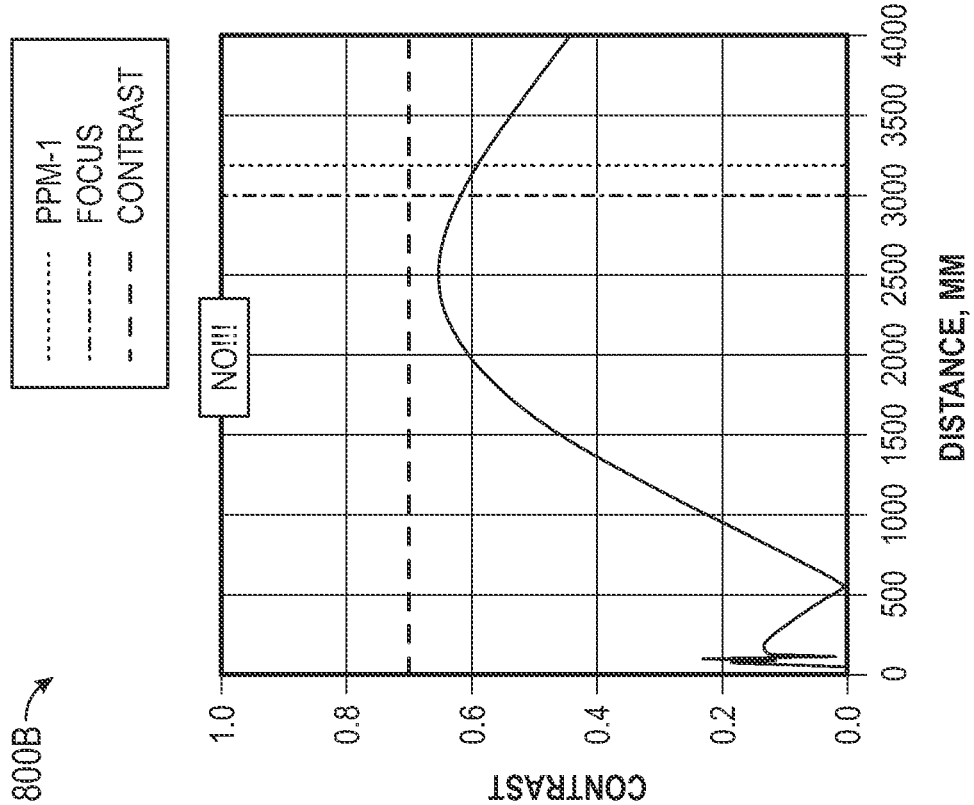
FIGS. 8A-8B illustrate different graphs of contrast vs. distance for the workcell depicted in FIG. 7, according to one embodiment.
Figure 8A:
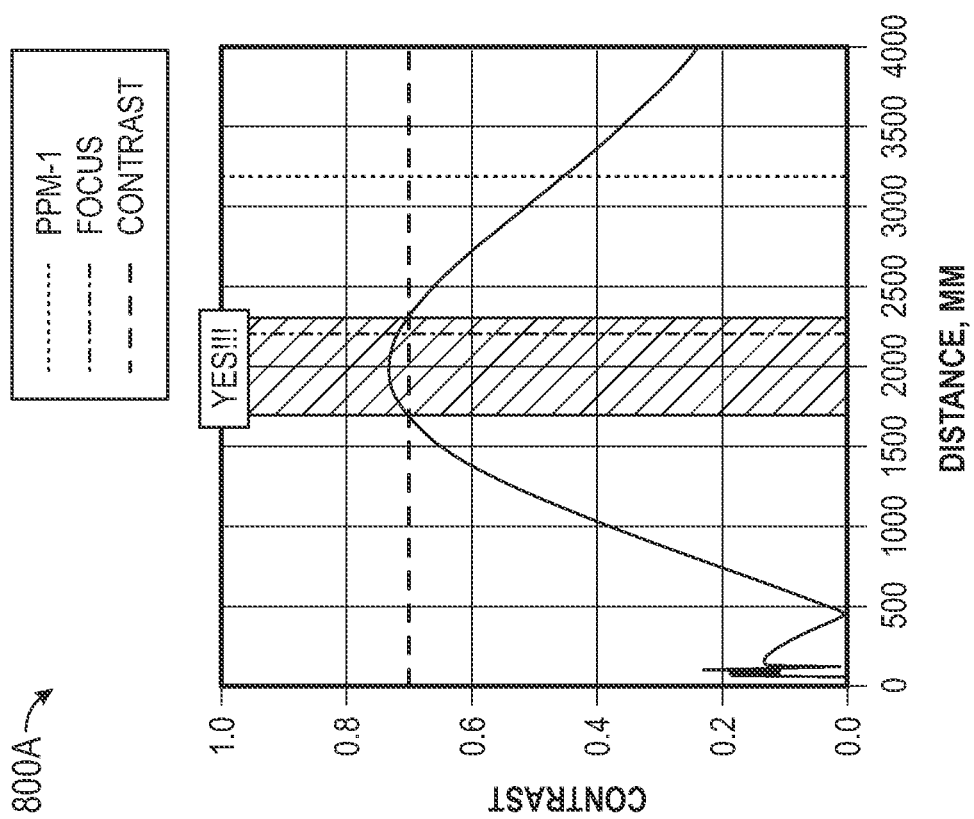

FIGS. 8A-8B, for example, depict two contrast vs. distance plots 800A and 800B for the workcell 700 at different focus distances, according to one embodiment. As shown in FIG. 8A, having a focus distance at approximately 2250 millimeters (mm) may lead to an acceptable scan volume. In contrast, as shown in FIG. 0.8B, having a focus distance at approximately 5000 mm may lead to an unacceptable scan volume.

Figures 9A, 9B:
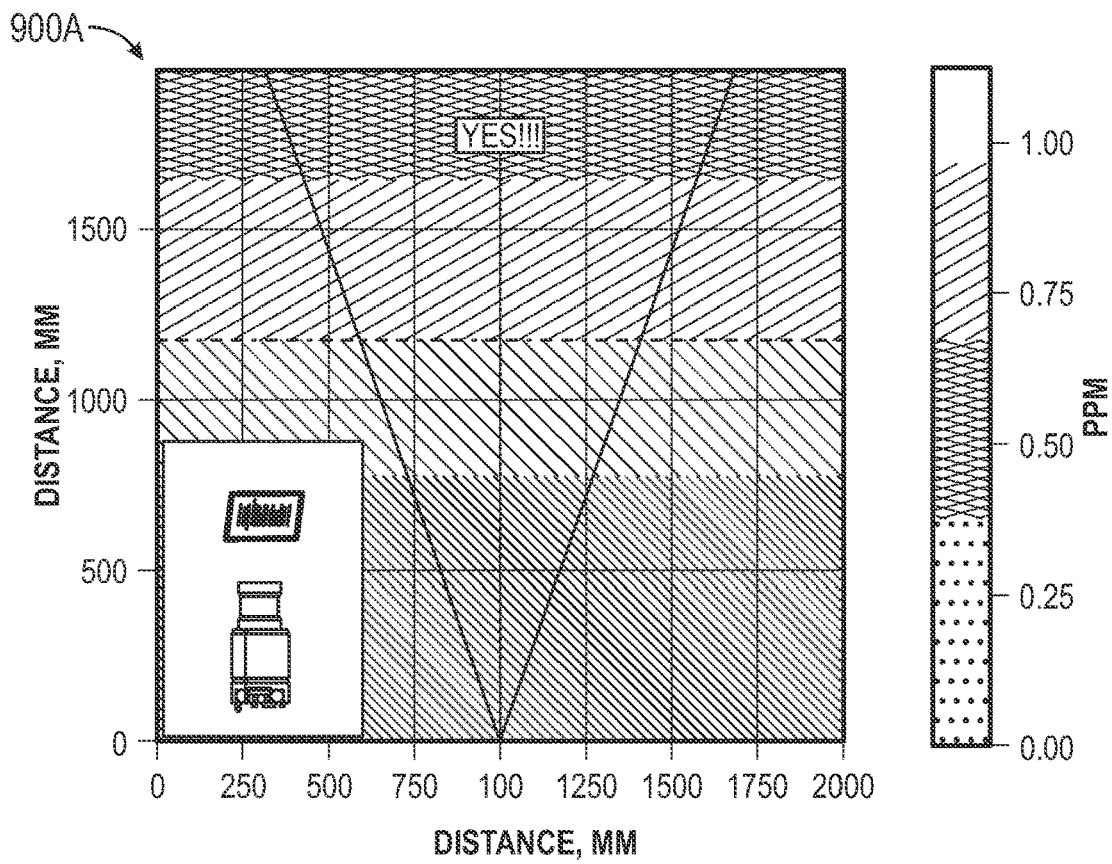
FIGS. 9A-9B illustrate scan volume plots for a workcell, according to one embodiment.

FIGS. 9A-9B illustrate distance plots 900A and 900B for the workcell 700 at different barcode angles, according to one embodiment. As shown in FIG. 9A, having the structured identifier be parallel relative to the camera device may result in an acceptable work distance within the FoV of the camera device. In contrast, as shown in FIG. 9B, having the structured identifier at an angle relative to the camera device may result in an unacceptable work distance within the FoV of the camera device.

Figure 10:
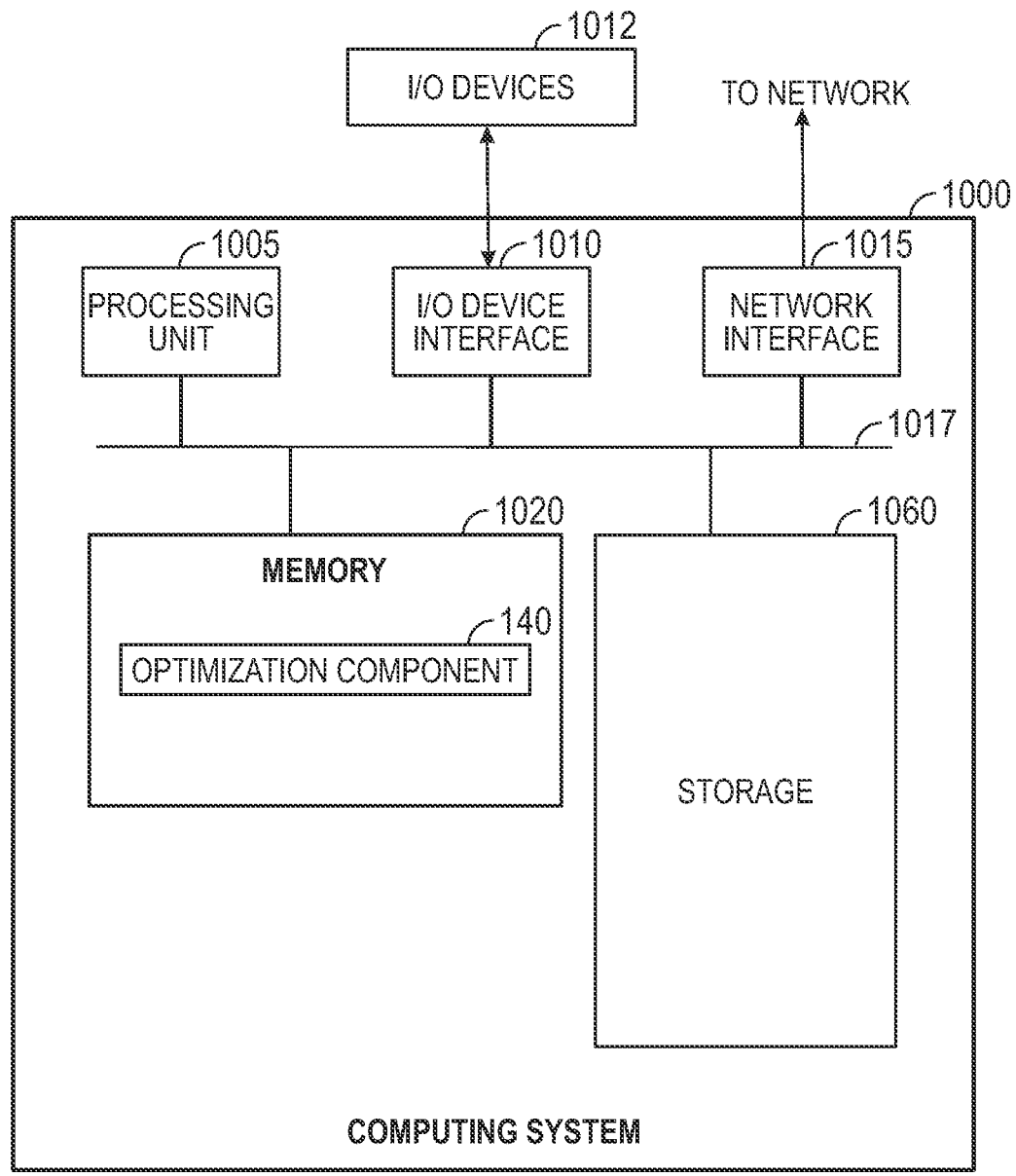
FIG. 10 illustrates an example computing system with an optimization component, according to one embodiment.

FIG. 10 illustrates a computing system 1000 configured to optimize a camera-based scanning system, according to one embodiment. As shown, the computing system 1000 includes, without limitation, a processing unit 1005, a network interface 1015, a memory 1020, and storage 1060, each connected to a bus 1017. The computing system 1000 may also include an I/O device interface 1010 connecting I/O devices 1012 (e.g., keyboard, mouse, and display devices) to the computing system 1000. Further, in context of this disclosure, the computing elements shown in the computing system 1000 may correspond to a physical computing system (e.g., a system in a data center) or may be a virtual computing instance executing within a computing cloud. In one embodiment, the computing system 1000 can be an example of the computing system illustrated in FIG. 1 (e.g., management system 150).

The processing unit 1005 retrieves and executes programming instructions stored in the memory 1020 as well as stores and retrieves application data residing in the memory 1020. The interconnect 1017 is used to transmit programming instructions and application data between processing unit 1005, I/O devices interface 1010, storage 1060, network interface 1015, and memory 1020. Note processing unit 1005 is included to be representative of a central processing unit(s) (CPU(s)) and/or a graphics processing unit(s) (GPU(s)). For example, the processing unit may represent a single CPU, a single GPU, multiple CPUs, multiple GPUs, a single CPU having multiple processing cores, a combination of CPU(s) and GPU(s), and the like. Memory 1020 is generally included to be representative of a random access memory. The storage 1060 may be a disk drive storage device. Although shown as a single unit, storage 1060 may be a combination of fixed and/or removable storage devices, such as fixed disc drives, removable memory cards, or optical storage, network attached storage (NAS), or a storage area-network (SAN). Illustratively, the memory 1020 includes the optimization component 140, which is described in more detail above.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., optimization component 140) or related data available in the cloud. For example, the optimization component 140 could execute on a computing system in the cloud and determine deployment information for deploying one or more camera devices to achieve a target scan volume. In such a case, the optimization component 140 could store the deployment information at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. An optimization system for a camera-based scanning system, the optimization system comprising:
   a frame providing one or more mounting locations for at least one camera device, wherein the at least one camera device comprises an imaging sensor and an optical lens; and
   a computing system configured to:
      obtain an indication of a plurality of parameters for the camera-based scanning system, wherein the plurality of parameters comprise at least a first set of parameters of the imaging sensor and a second set of parameters of the optical lens, wherein the second set of parameters comprises a first focus distance;
      instruct the at least one camera device to focus on a structured identifier at the first focus distance;
      for each second focus distance of a plurality of second focus distances:
         instruct the at least one camera device to adjust the focus on the structured identifier to the second focus distance; and
         determine, based one evaluating one or more of the first set of parameters and one or more of the second set of parameters with at least one computer vision (CV) model, one or more scanning parameters of the at least one camera device at the second focus distance; and
      generate an indication of a scanning volume of the at least one camera device, based on the scanning parameters.

2. The optimization system of claim 1, wherein:
   the plurality of parameters further comprise a third set of parameters of the at least one CV model; and
   the third set of parameters comprise at least a target contrast for decoding the structured identifier and a target number of pixels per module for decoding the structured identifier.

3. The optimization system of claim 2, wherein the one or more scanning parameters of the at least one camera device at a respective second focus distance are further determined based on evaluating one or more of the third set of parameters with the at least one CV model.

4. The optimization system of claim 1, wherein the plurality of parameters further comprises a third set of parameters associated with one or more illumination devices disposed in an environment comprising the frame.

5. The optimization system of claim 4, wherein the one or more scanning parameters of the at least one camera device at a respective second focus distance are further determined based on evaluating one or more of the third set of parameters with the at least one CV model.

6. A computer-implemented method for optimizing deployment of a camera scanning system in an environment for item identification, the computer-implemented method comprising:
    obtaining a first set of parameters of the camera scanning system;
    obtaining a second set of parameters of the environment;
    determining a third set of parameters of a predicted scan volume of the camera scanning system within the environment, based on the first set of parameters and the second set of parameters;
    upon determining that the predicted scan volume satisfies a first predetermined condition at a first time interval, modifying at least one of the first set of parameters or the second set of parameters; and
    upon determining that the predicted scan volume satisfies a second predetermined condition at a second time interval, transmitting an indication of at least one of the first set of parameters, the second set of parameters, or the third set of parameters.

7. The computer-implemented method of claim 6, wherein the first set of parameters comprises at least one of (i) a number of camera devices of the camera scanning system, (ii) a location for each of the number of camera devices, or (iii) an orientation for each of the number of camera devices.

8. The computer-implemented method of claim 7, wherein:
    each camera device comprises an imaging sensor and an optical lens; and
    the first set of parameters further comprises at least one of (i) at least one parameter associated with the imaging sensor or (ii) at least one parameter associated with the optical lens.

9. The computer-implemented method of claim 6, wherein the second set of parameters comprises at least one of: (i) at least one parameter associated with illumination in the environment or (ii) a target resolution of a structured identifier within the environment.

10. The computer-implemented method of claim 6, wherein the third set of parameters comprise at least one of a location of the scan volume in the environment or a size of the scan volume in the environment.

11. The computer-implemented method of claim 6, wherein the first predetermined condition comprises determining that an estimated read rate of a structured identifier within the predicted scan volume is below a predetermined threshold.

12. The computer-implemented method of claim 6, wherein the at least one of the first set of parameters or the second set of parameters is continually modified until the predicted scan volume satisfies the second predetermined condition.

13. The computer-implemented method of claim 12, wherein the second predetermined condition comprises determining that an estimated read rate of a structured identifier within the predicted scan volume is greater than a predetermined threshold.

14. A computer-readable storage medium storing instructions, which, when executed on one or more computer processors, perform an operation comprising:
    obtaining a first set of parameters of a camera scanning system within an environment;
    obtaining a second set of parameters of the environment;
    determining a third set of parameters of a predicted scan volume of the camera scanning system within the environment, based on the first set of parameters and the second set of parameters;
    upon determining that the predicted scan volume satisfies a first predetermined condition, modifying at least one of the first set of parameters or the second set of parameters; and
    upon determining that the predicted scan volume satisfies a second predetermined condition, transmitting an indication of at least one of the first set of parameters, the second set of parameters, or the third set of parameters.

15. The computer-readable storage medium of claim 14, wherein the first set of parameters comprises at least one of (i) a number of camera devices of the camera scanning system, (ii) a location for each of the number of camera devices, or (iii) an orientation for each of the number of camera devices.

16. The computer-readable storage medium of claim 15, wherein:
    each camera device comprises an imaging sensor and an optical lens; and
    the first set of parameters further comprises at least one of (i) at least one parameter associated with the imaging sensor or (ii) at least one parameter associated with the optical lens.

17. The computer-readable storage medium of claim 14, wherein the second set of parameters comprises at least one of: (i) at least one parameter associated with illumination in the environment or (ii) a target resolution of a structured identifier within the environment.

18. The computer-readable storage medium of claim 14, wherein the third set of parameters comprise at least one of a location of the scan volume in the environment or a size of the scan volume in the environment.

19. The computer-readable storage medium of claim 14, wherein the first predetermined condition comprises determining that an estimated read rate of a structured identifier within the predicted scan volume is below a predetermined threshold.

20. The computer-readable storage medium of claim 14, wherein the at least one of the first set of parameters or the second set of parameters is continually modified until the predicted scan volume satisfies the second predetermined condition.

* * * * *